US007429155B2

(12) United States Patent
Sakano et al.

(10) Patent No.: US 7,429,155 B2
(45) Date of Patent: Sep. 30, 2008

(54) WHEELCHAIR-FIXING DEVICE, WHEELCHAIR-LOADABLE VEHICLE, AND WHEELCHAIR SYSTEM

(75) Inventors: Takashi Sakano, Hikone (JP); Teruhiko Hiruta, Higashioumi (JP)

(73) Assignee: Takata Corporation, Tokyo (JP)

( * ) Notice: Subject to any disclaimer, the term of this patent is extended or adjusted under 35 U.S.C. 154(b) by 418 days.

(21) Appl. No.: 11/260,316

(22) Filed: Oct. 28, 2005

(65) Prior Publication Data

US 2006/0093452 A1 May 4, 2006

(30) Foreign Application Priority Data

Oct. 29, 2004 (JP) ............................. 2004-316456

(51) Int. Cl.
*B60P 3/06* (2006.01)

(52) U.S. Cl. .......................................................... 410/7

(58) Field of Classification Search ..................... 410/3, 410/4, 7, 8, 9, 10, 11, 19, 23
See application file for complete search history.

(56) References Cited

U.S. PATENT DOCUMENTS 4,389,056 A * 6/1983 Tenniswood ............. 280/304.1
4,995,775 A * 2/1991 Gresham ..................... 410/10
5,823,723 A * 10/1998 Finch .......................... 410/22
6,471,454 B1 * 10/2002 Koller ........................... 410/7
7,040,847 B1 * 5/2006 Cardona ........................ 410/7
2001/0055520 A1 12/2001 Budd et al.
2006/0193708 A1 * 8/2006 Ditch et al. .................... 410/7

FOREIGN PATENT DOCUMENTS

JP 5-25609 Y2 6/1993
JP 2003-159282 A 6/2003
NL 8 501 237 12/1986

* cited by examiner

*Primary Examiner*—H Gutman
(74) *Attorney, Agent, or Firm*—Foley & Lardner LLP

(57) ABSTRACT

A wheelchair-fixing device, a wheelchair-loadable vehicle, and a wheelchair system capable of ensuring the safety by securely fixing a wheelchair even against a collision of an automobile when the wheelchair is put in the automobile and also ensuring the easy operation for mounting the wheelchair to the automobile. A wheelchair-fixing device for fixing a wheelchair to a vehicle comprises a front holding member for holding a front portion of the wheelchair from the front side, and a derrick-type locking mechanism which holds a rear portion of the wheelchair with a rear holding member from the rear side by the raising operation thereof from a floor member. The front holding member holds the wheelchair at a position close to the feet of the occupant and the rear holding member holds the wheelchair at a position below the seat.

14 Claims, 10 Drawing Sheets

WHEELCHAIR-FIXING DEVICE, WHEELCHAIR-LOADABLE VEHICLE, AND WHEELCHAIR SYSTEM

BACKGROUND

The present invention relates to a wheelchair-fixing device for fixing a wheelchair with an occupant seated therein to a vehicle such as an automobile, to a wheelchair-loadable vehicle, and to a wheelchair system.

Nowadays, wheelchairs are widely used as simple vehicles which are necessary for permitting an occupant such as an injured person with wounded legs or a handicapped person with impaired legs to move in the seated state. Recently, automobiles provided with equipment for permitting a wheelchair with the occupant seated therein to be brought onto a rear space of the automobile in order to save the occupant's effort of riding on a seat of the automobile from the wheelchair have become popular.

When the wheelchair is put in the automobile, the wheelchair is easily unbalanced if the wheelchair is stopped only by the brake of the wheelchair. Therefore, the aforementioned rear space is required to be equipped with a fixing device for fixing the wheelchair. However, when such fixing device has a lot of members for fixing the wheelchair, the operation of fixing the wheelchair becomes troublesome. A simple operation is desired.

Accordingly, a fixing device in which a lateral portion of the wheelchair is locked by a striker type lock mechanism, which is of a type used for a door lock of an automobile or the like, and a stopper pawl projecting from a backside portion of the wheelchair is locked by an auxiliary lock mechanism has been proposed, such as can be seen in Japanese Patent Unexamined Publication 2003-159282 (hereby incorporated by reference herein in its entirety.

However, the fixing device for the wheelchair as described in the aforementioned JP Publication 2003-159282 is aimed at fixing the wheelchair during normal driving of the automobile. The locking by the striker type lock mechanism slightly loosens by a load received in a certain direction. In addition, since the striker type lock mechanism is a delicate linkage, it is not designed to withstand a large load. Therefore, the fixing device can not secure the wheelchair sufficiently relative to strong impact produced by sudden stop or collision of the automobile and can not ensure the safety of the occupant.

SUMMARY

One embodiment of the invention relates to a wheelchair-fixing device for fixing a wheelchair to a vehicle. The wheelchair-fixing device comprises a floor member on which the wheelchair can be mounted; a front holding member disposed on the floor member configured to hold a front portion of the wheelchair from the front side; and a derrick locking mechanism configured to hold a rear portion of the wheelchair with a rear holding member from the rear side by a raising operation.

Another embodiment of the invention relates to a wheelchair-loadable vehicle. The vehicle comprises a floor member on which a wheelchair can be mounted; a front holding member disposed on the floor member configured to hold a front portion of the wheelchair from the front side; and a derrick locking mechanism configured to hold a rear portion of the wheelchair with a rear holding member from the rear side by a raising operation from the floor member.

Another embodiment of the invention relates to a wheelchair system. The wheelchair system comprises a wheelchair; a wheelchair-fixing device which comprises a floor member on which the wheelchair can be mounted and which is transportable and mountable on the vehicle, a front holding member disposed on the floor member configured to hold a front portion of the wheelchair from the front side, and a derrick locking mechanism configured to hold a rear portion of the wheelchair with a rear holding member from the rear side by a raising operation from the floor member; and a control unit for controlling the raising and reclining operation of the derrick locking mechanism.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
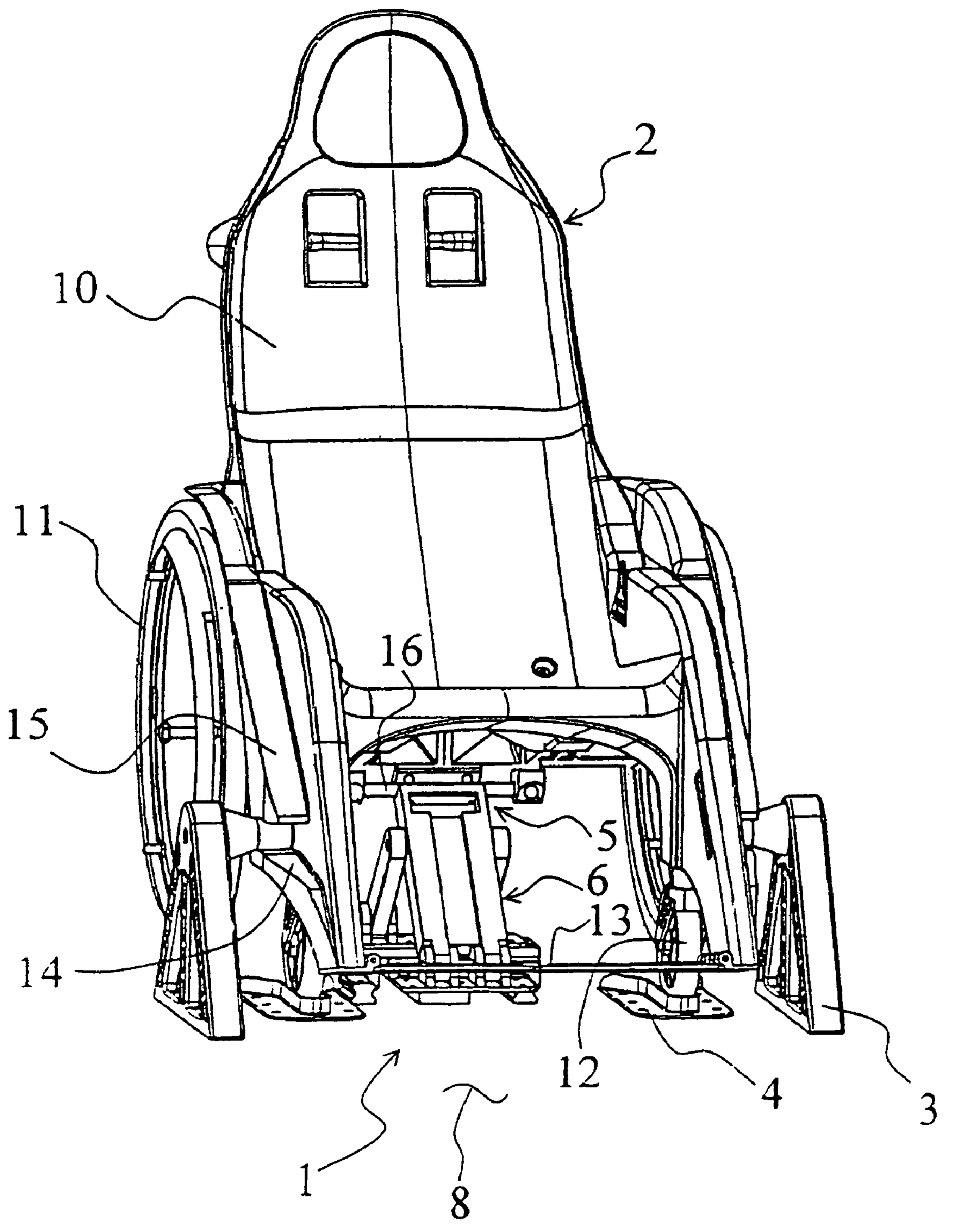
FIG. 1 is a perspective front view showing a wheelchair-fixing device according to an embodiment of the present invention and a wheelchair suitable for the device in a state that the wheelchair is attached to the wheelchair-fixing device.

An object of the present invention is to provide a wheelchair-fixing device, a wheelchair-loadable vehicle, and a wheelchair system capable of ensuring the safety by securely fixing a wheelchair even against a collision of an automobile when the wheelchair is put in the automobile and also ensuring the easy operation for mounting the wheelchair to the automobile.

For achieving the aforementioned object, a wheelchair-fixing device of an embodiment of the present invention is a wheelchair-fixing device for fixing a wheelchair to a vehicle comprising: a floor member on which the wheelchair can be mounted; a front holding member which is disposed on the floor member for holding a front portion of the wheelchair from the front side; and a derrick-type locking mechanism which holds a rear portion of the wheelchair with a rear holding member from the rear side by the raising and reclining operation thereof from the floor member.

To attach the wheelchair, the front portion of the wheelchair can be held by the front holding members only by moving the wheelchair forward from the predetermined position in the lateral direction. After that, the rear portion of the wheelchair can be held by the rear holding member by actuating the derrick-type locking mechanism. In this manner, the attachment of the fixing device is easily done. Since the wheelchair is strongly held by the front holding members and the rear holding member therebetween, the wheelchair is securely fixed even against strong frontal impact produced by sudden stop or collision of the automobile during the running of the automobile and against the reaction of such impact, thereby ensuring the safety of the occupant.

In the wheelchair-fixing device of an embodiment of the present invention, it is preferable that the front holding member holds the wheelchair at a position close to the feet of an occupant in the wheelchair and the rear holding member holds the wheelchair at a position below the seat of the wheelchair.

Accordingly, the wheelchair with the occupant seated therein can be stably held in the anteroposterior direction and thus can be reliably fixed.

In the wheelchair-fixing device of an embodiment of the present invention, it is preferable that the derrick-type locking mechanism comprises: a rail which is installed in the floor member to extend along the anteroposterior direction of the wheelchair when fixed; a slider which is slidable along the rail; a slider driving unit for driving the slider to slide; a locking member of which one end is pivotally connected to the floor member and the other end is provided with the rear holding member; and a connecting member of which one end is pivotally connected to the slider and the other end is pivotally connected to a body portion of the locking member.

Accordingly, the holding and release of the rear holding member to and from the rear portion of the wheelchair and the raising and reclining of the rear holding member can be smoothly conducted by driving the slider driving unit. Since the locking member can be kept in the reclined state, the locking member is prevented from colliding with the wheelchair so as to allow the smooth movement of the wheelchair when the wheelchair is moved forward or backward for holding or releasing the front portion of the wheelchair to or from the front holding members.

It is preferable that the wheelchair-fixing device of an embodiment of the present invention further comprises a control unit for controlling the raising and reclining operation of the derrick-type locking mechanism.

Accordingly, the holding and release of the rear holding member, i.e., the fixing and release of the wheelchair can be easily conducted by the occupant or a care provider.

In the wheelchair-fixing device of an embodiment of the present invention, the floor member may be of a transportable type and can be mounted on the vehicle.

Accordingly, the wheelchair can be fixed to the floor member of the wheelchair-fixing device outside the vehicle and the floor member is then carried on the vehicle, thereby achieving the fixation of the wheelchair to the vehicle.

In the wheelchair-fixing device of an embodiment of the present invention, the floor member may be formed integrally with the vehicle.

Accordingly, the height of a space for mounting the wheelchair in the automobile can be increased.

It is preferable that the wheelchair-fixing device of an embodiment of the present invention further comprises a fastener which detachably attaches the front holding member and the derrick-type locking mechanism to the floor member.

Accordingly, when there is no need for fixing the wheelchair, the wheelchair-fixing device can be easily removed from the floor member. Therefore, in case that the floor member of the wheelchair-fixing device is integrally formed with the vehicle, the space to be freely used can be increased because of the removal so that the interior space of the automobile can be used effectively.

For achieving the aforementioned object, a wheelchair-loadable vehicle of an embodiment of the present invention is a wheelchair-loadable vehicle having a floor member on which the wheelchair can be mounted, comprising: a front holding member which is disposed on the floor member for holding a front portion of the wheelchair from the front side; and a derrick-type locking mechanism which holds a rear portion of the wheelchair with a rear holding member from the rear side by the raising operation thereof from the floor member.

For achieving the aforementioned object, a wheelchair system of the present invention comprises: a wheelchair; a wheelchair-fixing device which comprises a floor member on which the wheelchair can be mounted and which is of a transportable type and can be mounted on the vehicle, a front holding member which is disposed on the floor member for holding a front portion of the wheelchair from the front side, and a derrick-type locking mechanism which holds a rear portion of the wheelchair with a rear holding member from the rear side by the raising operation thereof from the floor member; and a control unit for controlling the raising and reclining operation of the derrick-type locking mechanism.

An embodiment of the present invention can ensure both the safety by securely fixing a wheelchair even against a collision of an automobile when the wheelchair is put in the automobile and the easy operation for mounting the wheelchair to an automobile.

Hereinafter, an embodiment of the present invention will be described with reference to the attached drawings.

Figure 2:
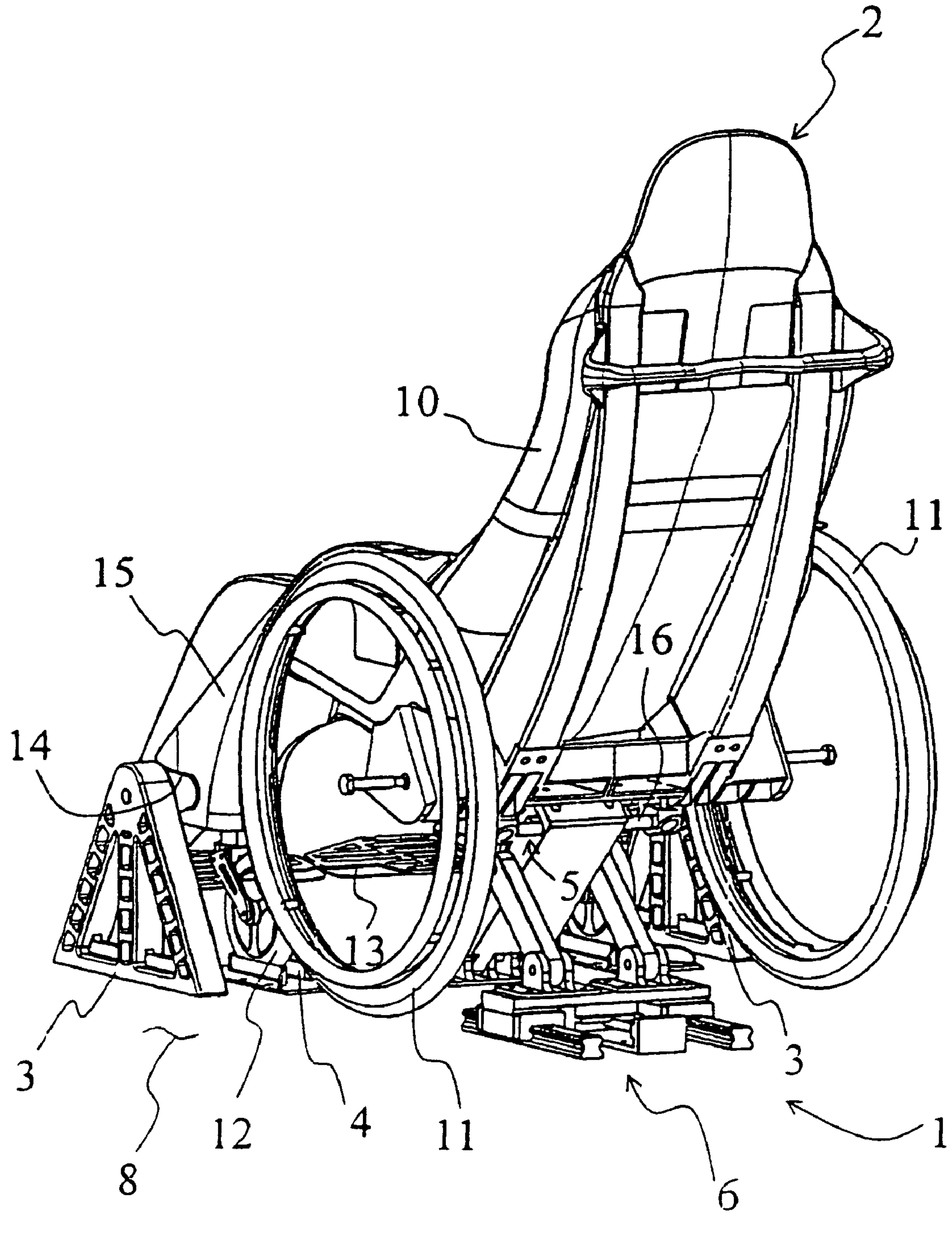
FIG. 2 is a perspective rear view showing the same in the state that the wheelchair is attached to the wheelchair-fixing device.
Figure 3:
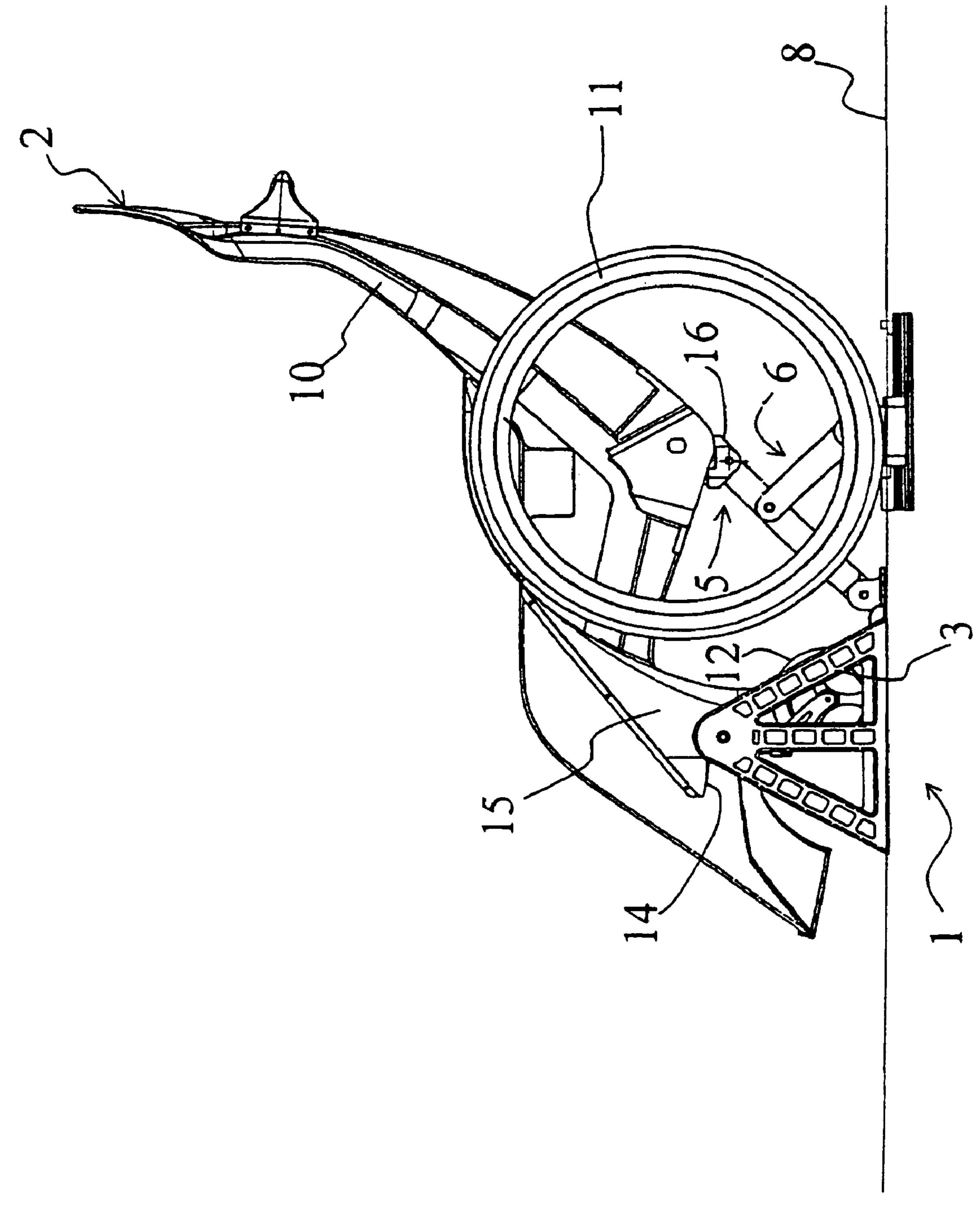
FIG. 3 is a side view showing the same in the state that the wheelchair is attached to the wheelchair-fixing device.

FIG. 1 is a perspective front view showing a wheelchair-fixing device according to an embodiment of the present invention and a wheelchair suitable for the device in a state that the wheelchair is attached to the wheelchair-fixing device, FIG. 2 is a perspective rear view showing the same state that the wheelchair is attached to the wheelchair-fixing device, and FIG. 3 is a side view showing the same state that the wheelchair is attached to the wheelchair-fixing device. In FIG. 1, FIG. 2, and FIG. 3, the wheelchair-fixing device 1 of this embodiment schematically comprises a pair of front holding members 3 for holding a front portion of a wheelchair 2 at positions where the front portion of the wheelchair 2 is sandwiched therebetween, a pair of auxiliary wheel stoppers 4 for receiving front auxiliary wheels (as will be described later) of the wheelchair 2, a derrick-type locking mechanism 6 with a rear holding member 5 which is positioned below a seat body (as will be described later) of the wheelchair 2 to lock a rear portion of the wheelchair 2, and a control unit 7 (not shown) for controlling the operation of the derrick-type locking mechanism 6.

These components, except rails and a slider driving unit of the derrick-type locking mechanism 6, are installed to a floor member 8 by screws or the like and are arranged such that the wheelchair 2 attached is directed to face the traveling direction of the automobile. The floor member 8 is of a transportable type, but not shown, and is brought in and placed to a predetermined space (a rear space without seat or a passenger seat's space) by a known lifting mechanism (not shown).

The structure of the wheelchair 2 shown in FIG. 1, FIG. 2, and FIG. 3 will be described schematically here. The wheelchair 2 comprises a seat body 10, a pair of main wheels 11 provided on both sides of a rear lower portion of the seat body 10, a pair of front auxiliary wheels 12 provided on both sides of a front lower portion of the seat body 10, a pair of footrests 13 provided on both sides of a front portion of the seat body 10, attachments 15 which are attached to front-side outer lateral surfaces of the seat body 10 and have fitting slits 14 opening to the front, and an engaging bar 16 which is located below a rear seating portion of the seat body 10 and extends substantially horizontal in the lateral direction.

Figure 4:
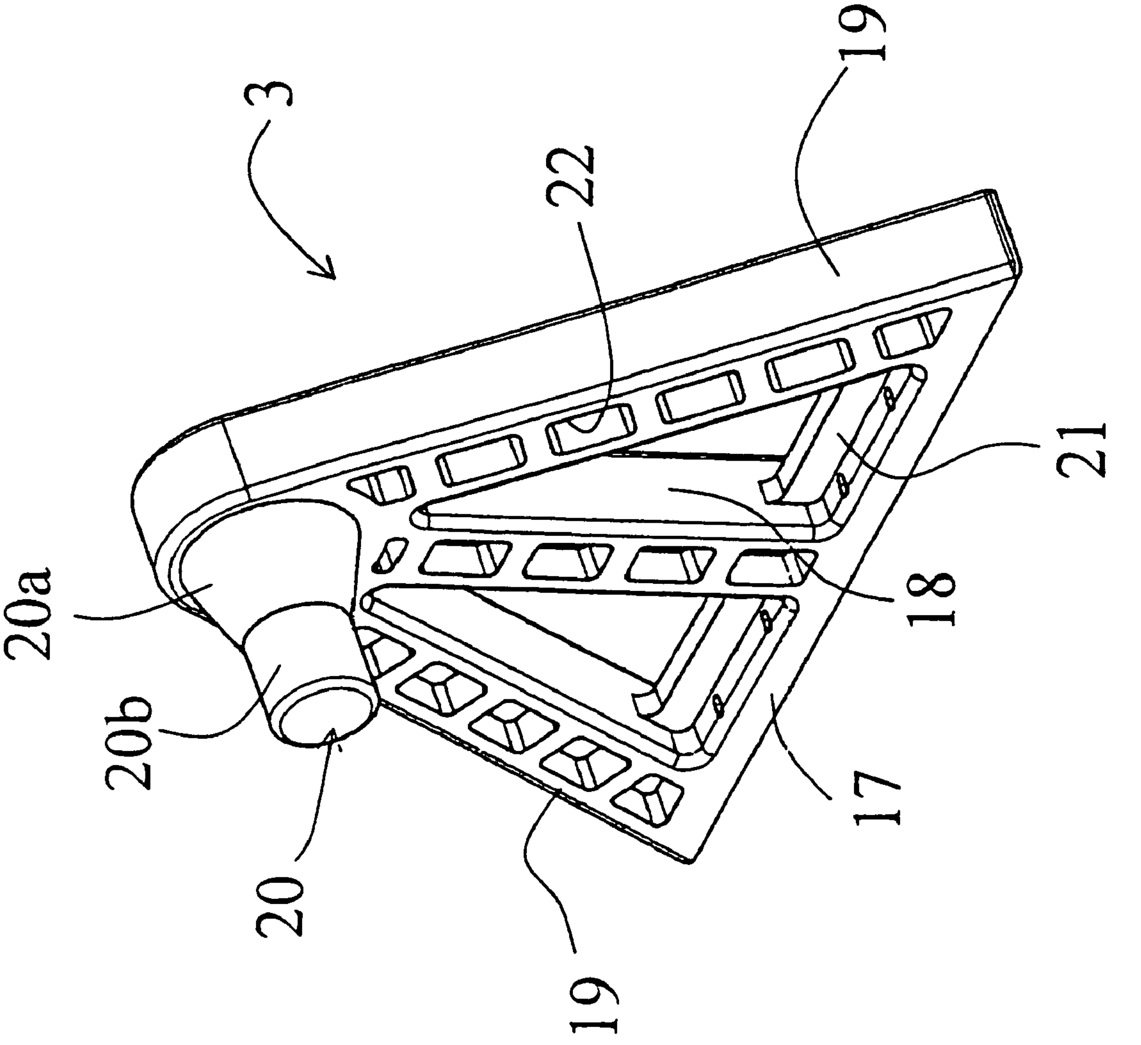
FIG. 4 is a perspective view of a front holding member to be positioned on the left side of the occupant in the wheelchair.

Hereinafter, the respective components of the wheelchair-fixing device 1 will be described in detail. First, FIG. 4 is an entire perspective view of the front holding member 3 to be positioned on the left side of the occupant in the wheelchair 2. The front holding member 3 will be described with reference to FIG. 4. The front holding member 3 comprises a fixing plate portion 17 to be located such that the longitudinal direction thereof extends along the anteroposterior direction of the wheelchair 2 when fixed, a main column portion 18 standing vertically from the middle of the fixing plate portion 17, two strengthen column portions 19 obliquely extending from the upper end of the main column portion 18 to the both ends of the fixing plate portion 17 and connecting the main column portion 18 and the fixing plate portion 17, and a fitting projection 20 projecting laterally from the upper end of the main column portion 18 toward the center line of the wheelchair 2, wherein the fixing plate portion 17, the main column portion 18, the auxiliary column portions 19, and the fitting projection 20 are formed integrally. Ribs 21 are formed on the upper surface of the fixing plate portion 17 for reinforcement. The main column portion 18 and the respective auxiliary column portions 19 are formed with a lot of cavities for lightening in weight.

The configurations of the two front holding members 3 are completely the same. The front holding members 3 are arranged such that the fitting projections 20 confront each other and the fixing plate portions 17 extend in parallel with each other. The distance between the ends of the confronting two fitting projections 20 is narrower than that of the front portion including the attachments 15 on both sides of the wheelchair 2. The front holding members 3 are arranged to sandwich the seat body 10 from both sides such that the fitting projections 20 enter into the fitting slits 14 which are formed in the attachment 15 at the same level as the fitting projections 20. The fitting slits 14 on both sides are grooves which are formed horizontally at the same level to extend for the same length and of which the front end is open and the rear end is closed. Accordingly, by disposing the wheelchair 2 at a predetermined position in the lateral direction and moving the wheelchair 2 forward from behind the front holding members 3, the fitting projections 20 can be inserted into the fitting slits 14 and stopped at the closed ends of the fitting slits 14. That is, the front portion of the wheelchair 2 can be held by the front holding members 3 from the front of the wheelchair 2.

The fitting projection 20 has a root portion 20*a* connected to the main column portion 18 formed in a tapered shape, of which diameter is larger than the width of the fitting slit 14 and is gradually decreased towards the end, and has an end portion 20*b* formed in a cylindrical shape, of which diameter is smaller than the width of the fitting slit 14. The edge of the fitting slit 14 is chamfered, but not shown. Therefore, when the fitting projection 20 is stopped at the closed end of the fitting slit 14, the end portion 20*b* of the fitting projection 20 is stopped at the closed end of the fitting slit 14 and the tapered portion of the root portion 20*a* of the fitting projection 20 bites into the chamfered portion of the fitting slits 14, thereby achieving strong holding.

Figure 5:
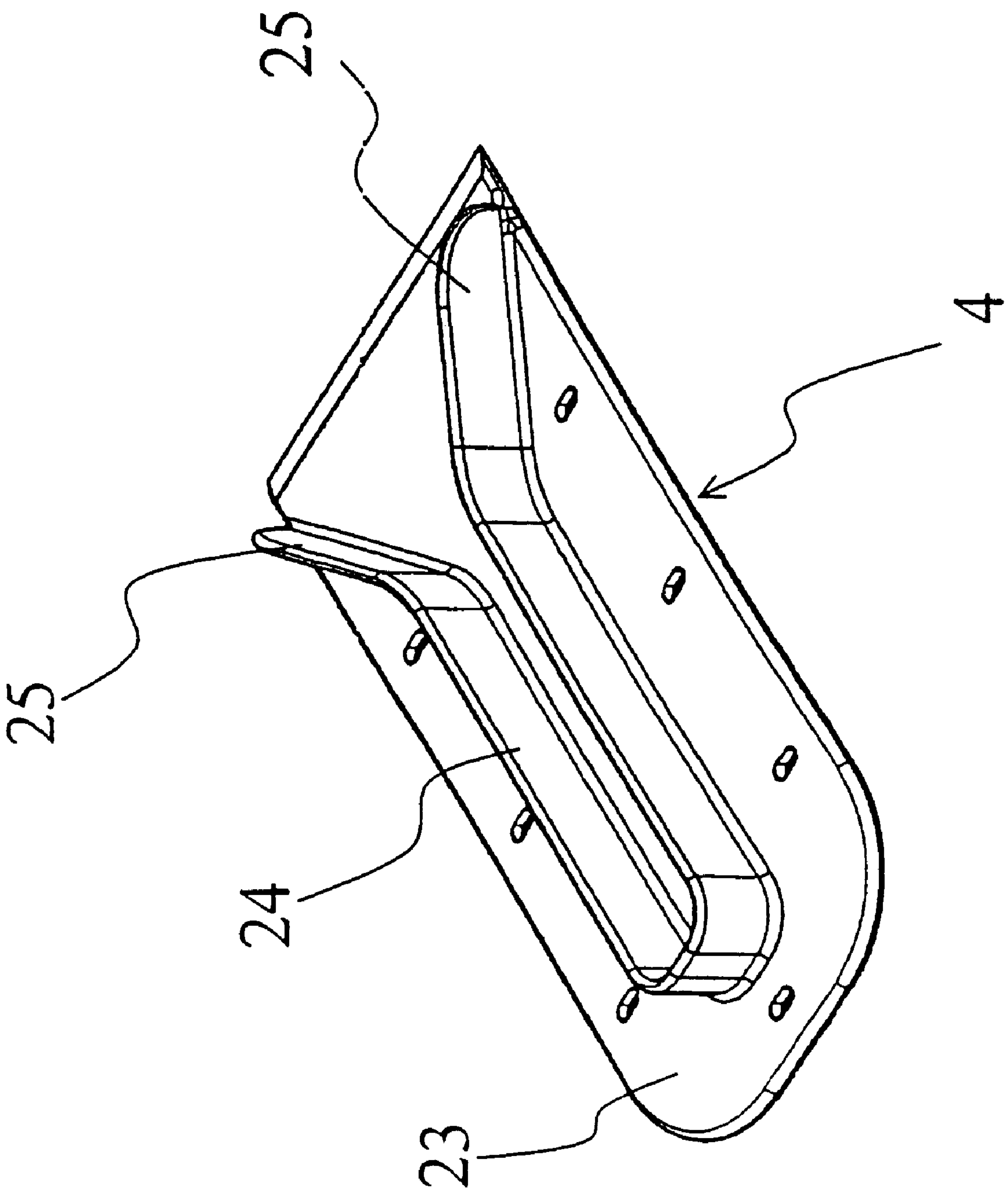
FIG. 5 is a perspective view of one of the auxiliary wheel stoppers.

Now, the auxiliary wheel stoppers 4 will be described. FIG. 5 is an entire perspective view of one of the auxiliary wheel stoppers 4. In FIG. 5, the auxiliary wheel stopper 4 comprises a substantially rectangular fixing plate portion 23 to be placed such that the longitudinal direction thereof extends along the anteroposterior direction of the wheelchair 2 when fixed, a receiving wall portion 24 which stands from the fixing plate portion 23 into a U-like shape to open the rear side in the longitudinal direction, and two guide wall portions 25 which stand from the fixing plate portion 23 and extends such that the guide wall portions 25 are spaced apart from each other from the open side of the receiving wall portion 24 toward the rear end of the fixing plate portion 23.

The configurations of the two auxiliary wheel stoppers 4 are completely the same. The auxiliary wheel stoppers 4 are arranged such that the anteroposterior direction thereof corresponds to the anteroposterior direction of the wheelchair 2. The distance between the auxiliary wheel stoppers 4 is set to be the same as the distance between the front auxiliary wheels 12. When the aforementioned fitting projections 20 are stopped at the closed ends of the fitting slits 14, the two front auxiliary wheels 12 are fitted in the receiving walls 24. Accordingly, when the wheelchair 2 is fixed, each front auxiliary wheel 12, which is freely rotatable about its vertical shaft, can be stopped from rotating, thereby stably fixing the wheelchair 2.

The front auxiliary wheel 12 can be easily introduced into the narrower receiving wall portion 24 by the two guide wall portions 25. The rear end of the fixing plate portion 23 is formed to have a gentle slope and the rear ends of the guide wall portions 25 are rounded, thereby preventing the tires of the front auxiliary wheels 12 from being damaged.

Figure 6:
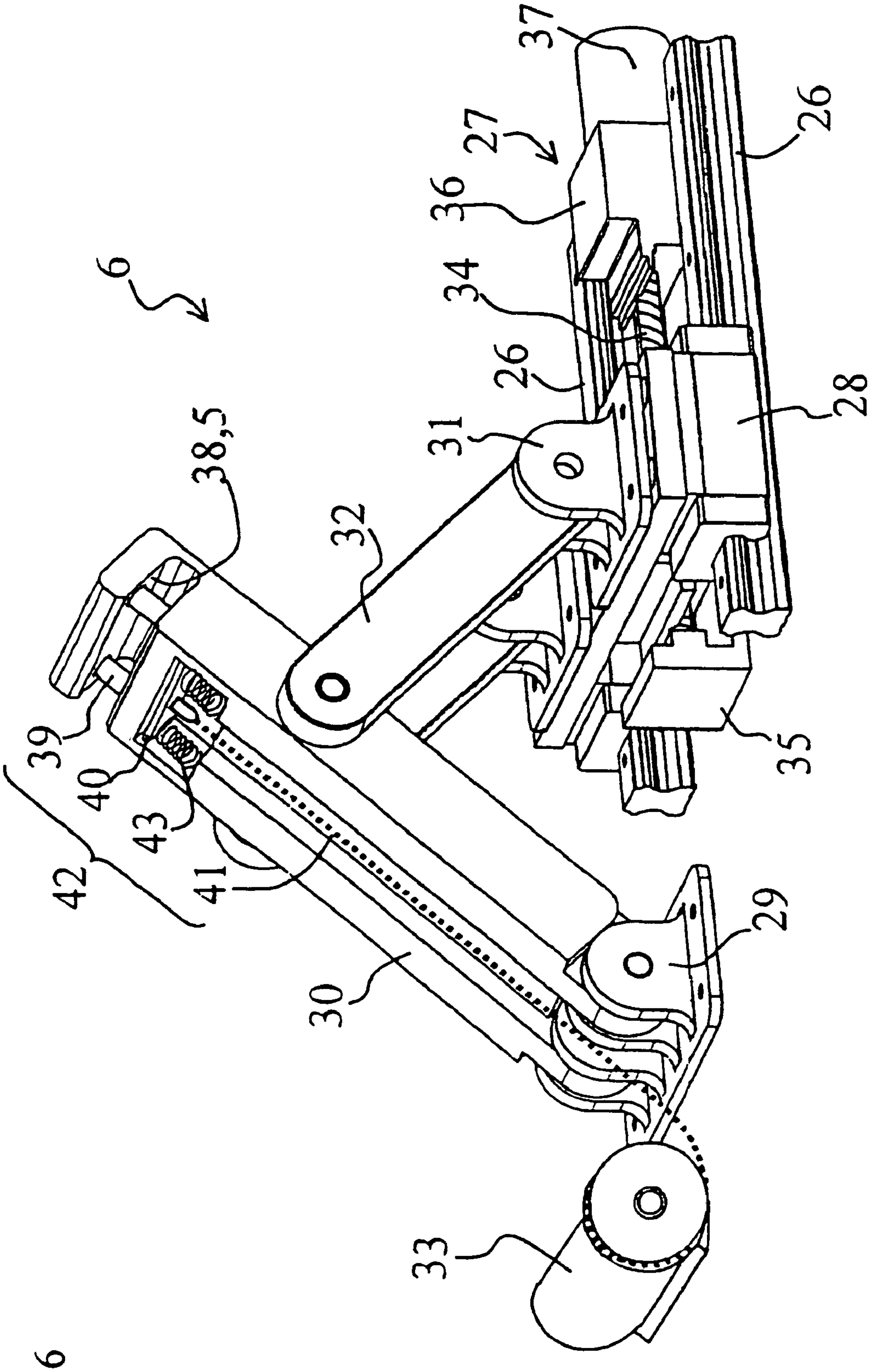
FIG. 6 is a perspective view of a derrick locking mechanism in a raised state.
Figure 7:
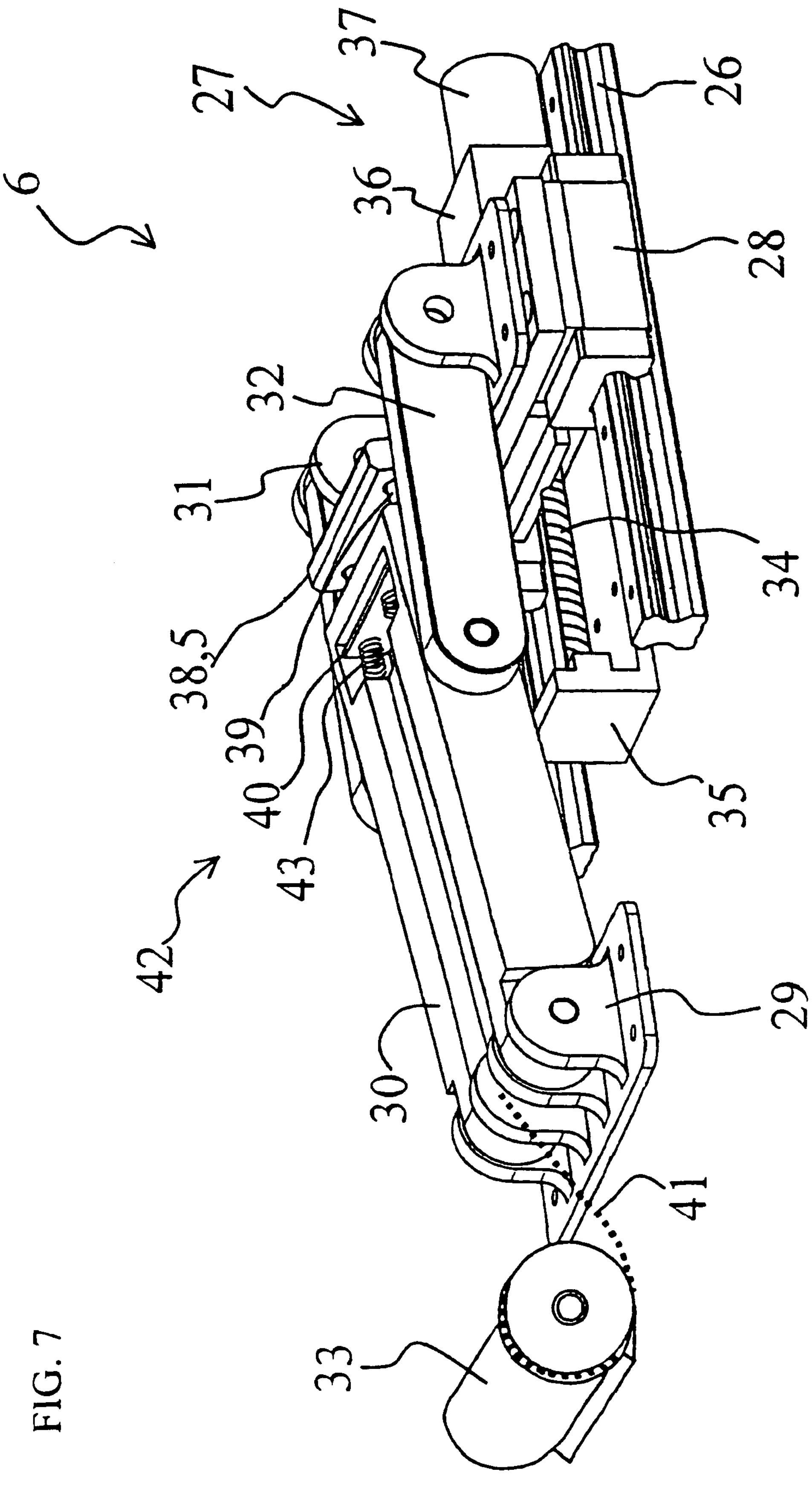
FIG. 7 is an entire perspective view of the derrick locking mechanism in a reclined state.

The description will now be made with regard to the derrick-type locking mechanism 6. FIG. 6 is an entire perspective view of the derrick-type locking mechanism 6 in a raised state for holding the rear portion of the wheelchair 2 and FIG. 7 is an entire perspective view of the derrick-type locking mechanism 6 in a reclined state for allowing the fixation and release of the wheelchair 2. In FIG. 6 and FIG. 7, the derrick-type locking mechanism 6 comprises a pair of rails 26 which are embedded in the floor member 8 and are positioned in parallel with each other along the anteroposterior direction of the wheelchair 2 when fixed, a slider driving unit 27 which is disposed between and in parallel with the pair of the rails 26 and is embedded in the floor member 8, a slider 28 which is connected to the slider driving unit 27 and the rails 26 and is slidable along the rails 26, a floor hinge 29 which is disposed on the floor member 8 in front of the slider driving unit 27, a locking member 30 of which one end is pivotally connected to the floor hinge 29 and the other end is provided with the rear holding member 5, slider hinges 31 which are disposed on the slider 28, connecting members 32 of which one end is pivotally connected to the slider hinge 31 and the other end is pivotally connected to a body portion of the locking member 30, and a engaging pin driving motor 33 which is disposed on the floor member 8 in front of the floor hinge 29.

The slider driving unit 27 comprises a feed screw 34 which extends along the anteroposterior direction and is threadably connected to the slider 28, a front end bearing 35 and a rear end bearing 36 rotatably supporting the front and rear ends of the feed screw 34, respectively, and a screw driving motor 37 which is connected to the rear end of the feed screw 34 and drives to rotate the feed screw 34 in the normal direction and the reverse direction. The feed screw 34 is rotated in the normal direction or the reverse direction by driving of the screw driving motor 37, whereby the slider 28 slides forward or backward corresponding to the rotational direction of the feed screw 34. Corresponding to the forward-backward movement of the slider 28, the connecting members 32 push or pull the locking member 30, whereby the locking member 30 pivots about the floor hinge 29 so as to raise or recline the locking member 30 (to rise the locking member 30 into the state shown in FIG. 6 or to recline the locking member 30 into the state shown in FIG. 7).

The locking member 30 has an engaging groove 38 which is formed substantially horizontally in the end portion thereof to open upward when the locking member 30 is in the reclined state. In this embodiment the engaging groove 38 composes the rear holding member 5. Two engaging pins 39 are provided for switching the opening portion of the engaging groove 38 into the open state or the closed state (In FIG. 6 and FIG. 7, the engaging pins 39 are in the closed state). A plate member 40 for connecting the two engaging pins 39 is always biased by springs 43 and the plate member 40 is connected to a wire 41. The winding and the release of the wire 41 is conducted by the engaging pin driving motor 33. In this manner, an engaging mechanism 42 is composed. The engaging pin driving motor 33 and the screw driving motor 37 are controlled by the control unit 7 as will be described later.

When the fitting projections 20 are stopped at the closed ends of the fitting slots 14, the engaging bar 16 of the wheelchair 2 is positioned above the derrick-type locking mechanism 6. In this state, the occupant (or a care provider) operates the control unit 7 (not shown) to drive the engaging pin driving motor 33 to move the engaging pins 39 to maintain the engaging groove 38 (rear holding member 5) in the open state and then drive the slider driving unit 27 (screw driving motor 37) to raise the locking member 30, whereby the engaging bar 16 of the wheelchair 2 enters into the engaging groove 38, that is, the rear holding member 5 holds the rear portion of the wheelchair 2 from the rear side as shown in FIG. 2 and FIG. 3.

Figure 8:
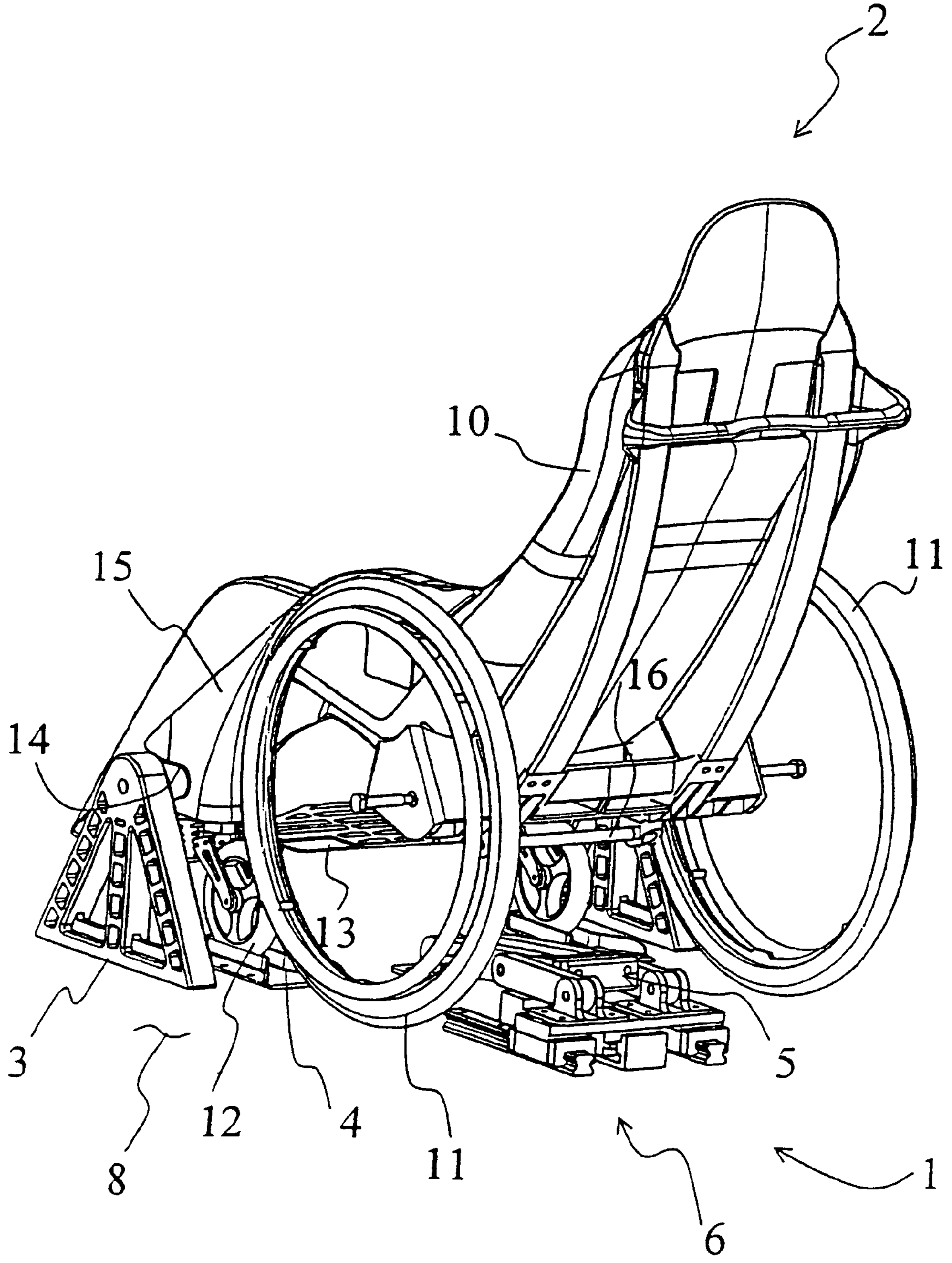
FIG. 8 is a rear perspective view of the derrick locking mechanism in the reclined state and the wheelchair.

By driving the screw driving motor 37 to rotate in the reverse direction to recline the locking member 30 in the state the engaging groove 38 is kept open, the engaging bar 16 can be released from the engaging groove 38, that is, the rear holding member 5 can be released from the rear portion of the wheelchair 2 as shown in FIG. 8.

As mentioned above, the holding and release of the rear holding member 5 to and from the rear portion of the wheelchair 2 and the raising and reclining of the locking member 30 can be smoothly conducted by driving the slider driving unit 27. Since the locking member 30 can be kept in the reclined state, the locking member 30 is prevented from colliding with the lower portion of the wheelchair 2 such as the footrests 13 so as to allow the smooth movement of the wheelchair 2 when the wheelchair 2 is moved forward or backward for holding or releasing the front portion (the fitting slits 14) of the wheelchair 2 to or from the front holding members 3 (the fitting projections 20).

Since the wheelchair-fixing device 1 of this embodiment has the front holding members 3 and the derrick-type locking mechanism 6 having the aforementioned structures, the wheelchair 2 can be easily attached as follows. The front portion of the wheelchair 2 is held by the front holding members 3 only by moving the wheelchair 2 forward from the predetermined position in the lateral direction. Then, the derrick-type locking mechanism 6 is actuated to hold the rear portion of the wheelchair 2 by the rear holding member 5. In this manner, the attachment of the fixing device is easily done.

Since the wheelchair 2 is strongly held by the front holding members 3 and the rear holding member 5 therebetween, the wheelchair 2 is securely fixed even against strong frontal impact produced by sudden stop or collision of the automobile during the running of the automobile and against the reaction of such impact, thereby ensuring the safety of the occupant.

As shown in FIG. 3, the front holding members 3 holds the wheelchair 2 at a position close to the feet of the occupant (position of the fitting slits 14) and the rear holding member 5 holds the wheelchair 2 at a position below the seat (position of the engaging bar 16 below the seat body 10), whereby the wheelchair 2 with the occupant seated therein can be stably held in the anteroposterior direction, thereby achieving the more secure fixation. In terms of the strength of the wheelchair 2 according to the structure, it is preferable that the portion (the engaging bar 16) to be held by the rear holding member 5 is positioned near the shaft of the main wheels 11 of the wheelchair 2 like this embodiment.

Since the rear holding member 5 has the engaging mechanism 42 for locking the engagement with the rear portion of the wheelchair 2, the engagement between the rear holding member 5 as a movable portion and the rear portion of the wheelchair 2 can be ensured, thereby fixing the wheelchair 2 strongly even against strong impact.

In case that the control unit 7 is disposed near the occupant, for example, around the left hand of the occupant, seated in the wheelchair 2, the occupant seated in the wheelchair 2 can control the operation of the derrick-type locking mechanism 6 including the engaging mechanism 42 to fix or release the wheelchair 2 by operating the control unit 7.

Hereinafter, a structural example of the control unit 7 and its operation will be described. As for the structure of the control unit 7, the control unit 7 comprises a console panel including a fixing button for fixing the wheelchair 2 and a release button for releasing the fixation and is provided inside thereof with a computer composed of a CPU, a ROM, and a RAM. Power is supplied to the computer from the power source of the automobile or a buttery separately provided and signal lines are connected to the computer for outputting driving signals to the screw driving motor 37 and the engaging pin driving motor 33.

Figure 9:
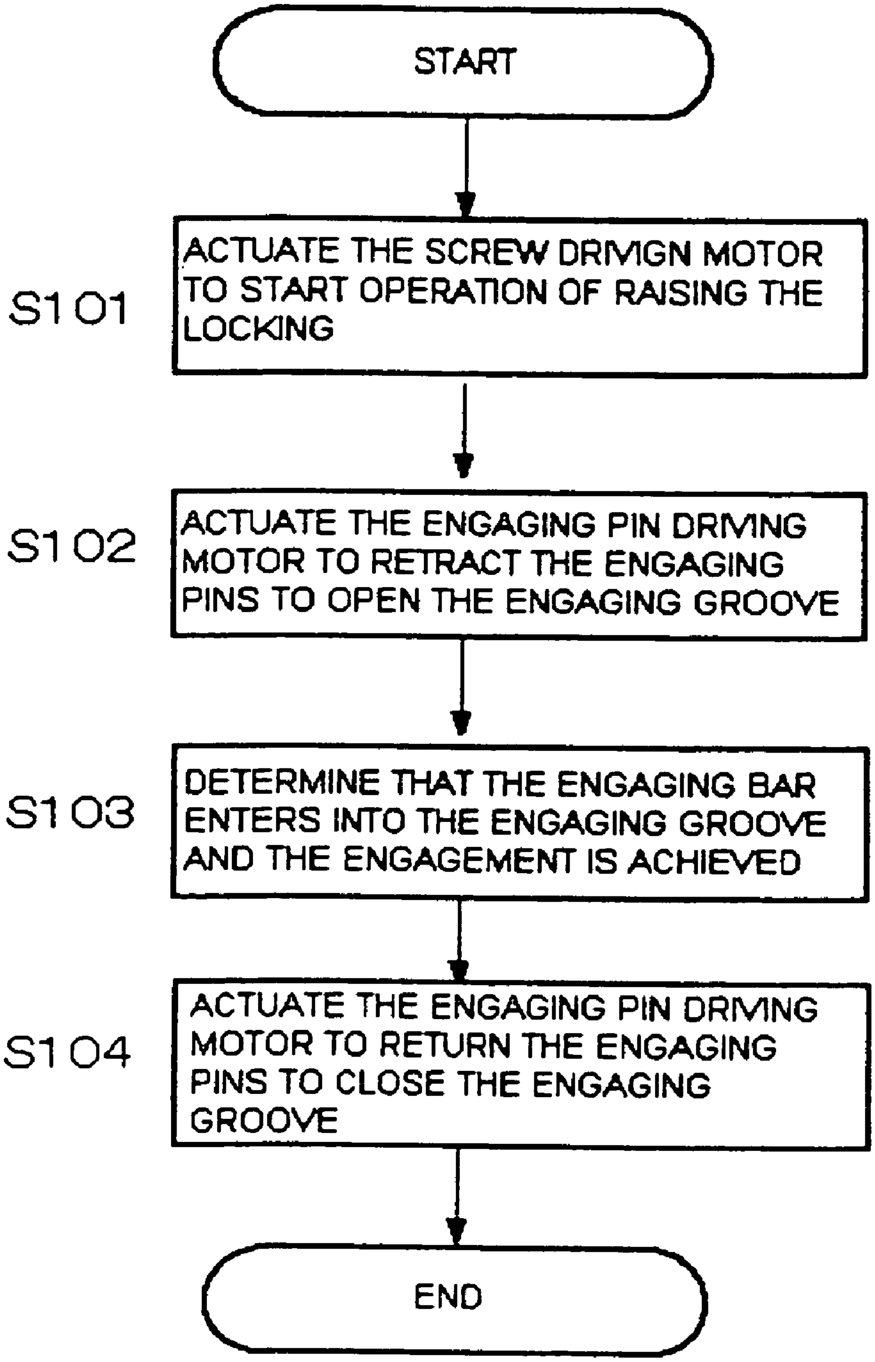
FIG. 9 is a flow chart showing the process flow of fixing operation conducted by a control unit to the derrick locking mechanism.

Now, the control by the control unit 7 for the fixing operation will be described. FIG. 9 is a flow chart showing the process flow of the fixing operation conducted by the control unit 7 to the derrick-type locking mechanism 6. The flow chart shows the process according to the corresponding program read by the CPU from the ROM when the occupant presses the aforementioned fixing button. In the drawing, each step is abbreviated as "S". Just before the fixing operation, the locking member 30 is in the reclined state and the engaging groove 38 is in the closed state.

First in Step 101, the screw driving motor 37 is operated to start the operation of raising the locking member 30. In Step 102, while the locking member 30 is raised, the engaging pin driving motor 33 is operated to draw the wire 41 to retract the engaging pins 39 to make the engaging groove 38 into the open state. In Step 103, it is determined that the engaging bar 16 enters into the engaging groove 38 and the engaging bar 16 and the engaging groove 38 become in the engaged state. Then, in Step 104, the engaging pin driving motor 33 is operated to release the wire 41 to return the engaging pins 39 so as to make the engaging groove 38 into the closed state. The process is ended. According to the aforementioned process, the engagement of the rear holding member 5 to the engaging bar 16 and the locking of the engagement by the engaging mechanism 42 are automatically conducted.

Figure 10:
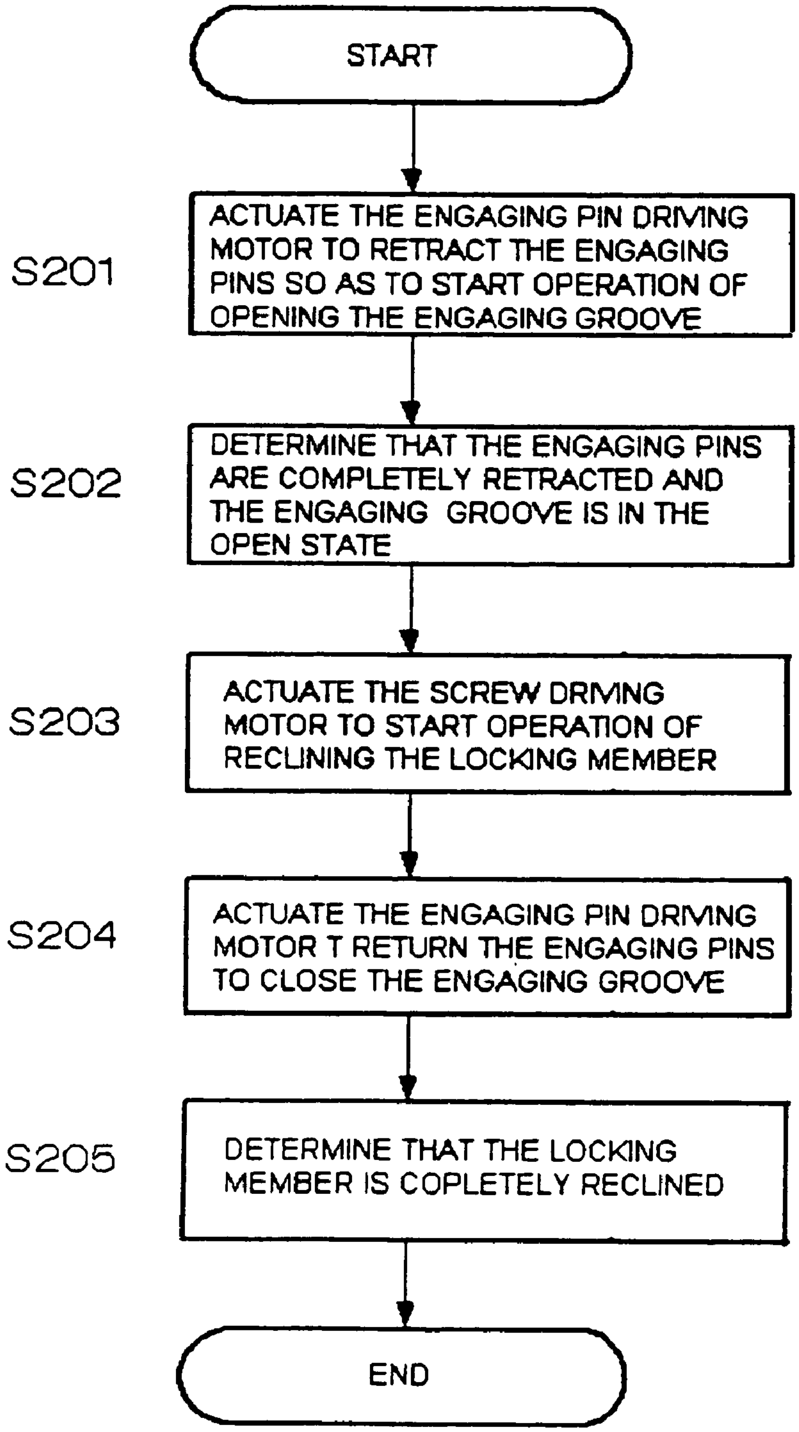
FIG. 10 is a flow chart showing the process flow of release operation conducted by a control unit to the derrick locking mechanism.

Next, the control by the control unit 7 for releasing operation will be described. FIG. 10 is a flow chart showing the process flow of the releasing operation conducted by the control unit 7 to the derrick-type locking mechanism 6. The flow chart shows the process according to the corresponding program read by the CPU from the ROM when the occupant presses the aforementioned releasing button. Just before the releasing operation, the locking member 30 is in the raised state, the rear holding member 5 is engaged with the engaging bar 16, and the engaging groove 38 is in the closed state.

First in Step 201, the engaging pin driving motor 33 is operated to draw the wire 41 to retract the engaging pins 39 so as to open the engaging groove 38. In Step 202, it is determined that the engaging pins 39 are completely retracted to make the engaging groove 38 into the open state. Then, in Step 203, the screw driving motor 37 is operated to start the operation of reclining the locking member 30. In step 204, while the locking member 30 is reclined, the engaging pin driving motor 33 is operated to release the wire 41 to return the engaging pins 39 so as to make the engaging groove 38 into the closed state. In Step 205, it is determined that the locking member 30 is completely reclined. The process is ended. According to the aforementioned process, the releasing operation by the engaging mechanism 42 and the disengaging operation of the rear holding member 5 from the engaging bar 16 are automatically conducted.

In the wheelchair-fixing device 1 of this embodiment, the control unit 7 for controlling the operation of the slider driving unit 27 is disposed within close reach of the occupant in the wheelchair 2, whereby the engagement and disengagement of the rear holding member 5 can be conducted by the occupant himself or herself. That is, the fixation and the release of the wheelchair 2 can be easily conducted by the occupant himself or herself without being aided by the care provider.

The control unit 7 may be disposed on the wheelchair 2 near the left hand of the occupant (not shown) or on the automobile (not shown) side beside the wheelchair-fixing device 1, and may be a remote controller capable of remote control by the occupant or the care provider. As for the operation by the care provider, the control unit 7 may be of a pedal-type permitting the operation by foot. Moreover, the control unit for the occupant and the control unit for the care provider may be both provided.

In the aforementioned control arrangement, a pressure sensor or the like may be disposed to the fitting slit 14. In this case, the control can be programmed such that the fixing operation is started only when the fitting projection 20 is held by the fitting slit 14, thereby preventing the fixing operation from being conducted with the fitting projection 20 is not stopped and avoiding futile fixing operation. Moreover, it is also useful that the control may be programmed such that the fixing operation is automatically started when it is determined that the fitting projection 20 is completely held by the fitting slit 14.

In the aforementioned embodiment, the fitting projections 20 are fitted into the fitting slits 14 so as to allow the front holding members 3 to hold the front portion of the wheelchair 2 from the front side, and the engaging bar 16 is entered into the engaging groove 38 formed in the end portion of the locking member 30 so as to allow the rear holding member 5 to hold the rear portion of the wheelchair 2 from behind.

All that's required by the spirit of the present invention is, however, to strongly hold the wheelchair 2 by the front holding member 3 and the rear holding member 5 therebetween. According to the spirit of the present invention, the structure of the present invention is not limited to the structure as mentioned above and may be a proper structure composed of a front holding member 3 and a rear holding member 5 corresponding to the configuration of a wheelchair 2 to be fixed.

Therefore, the slider driving unit 27 and the engaging mechanism 42 may be structure to use a rotating handle or a lever mechanism capable of retracting the wire for manual operation, instead of power of the motor and the control unit 7. In addition, another power such as a hydraulic cylinder driven by oil from a hydraulic pump or an air cylinder may be used, instead of the electric motor. The engaging mechanism 42 is not one of essential components for fixing the wheelchair 2 and may be eliminated as long as the front holding member 3 and the derrick-type locking mechanism 6 are structured to be able to strongly hold the wheelchair therebetween.

The floor member 8 is of a transportable type (a separate member from the automobile) in the aforementioned embodiment, but not limited thereto. The floor member 8 may be integrally formed with the automobile (the floor member 8 is the floor of the automobile or is fixed to the floor of the automobile). In this case, the automobile may be provided with a slope or the like for introducing the wheelchair 2 to the floor of the automobile. In case that the floor member 8 is the floor of the automobile, the components of the wheelchair-fixing device, except the rails and the slider driving unit of the derrick-type locking mechanism 6, are directly installed to the floor of the automobile (a wheelchair-loadable vehicle). In this case, in contrast to the transportable type, the thickness of the floor member 8 as a separate member is eliminated so as to increase the height of the space for mounting the wheelchair in the automobile. Further in this case, it is also useful that fasteners such as a latching mechanism or a snap lock may be provided on the floor 8 of the automobile for detachably fixing the front holding member 3 and the derrick-type locking mechanism 6 to the floor, but not shown. When there is no need for fixing the wheelchair 2, the wheelchair-fixing device 1 can be easily removed from the floor 8 of the automobile so as to increase the space to be freely used so that the interior space of the automobile can be used effectively. It should be understood that, also in case of the floor member 8 of a transportable type, the floor member 8 may be structured to be detachably fixed by fasteners.

It should be understood that the specific structure of this embodiment as described above is not intended to strictly limit the feature of the present invention and various changes and modifications on details may be made without departing from the scope of the invention.

Japan Priority Application 2004-316456, filed Oct. 29, 2004 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A wheelchair-fixing device for fixing a wheelchair to a vehicle, comprising:

a floor member on which the wheelchair can be mounted;

a front holding member disposed on the floor member configured to hold a front portion of the wheelchair from the front side; and a derrick locking mechanism configured to hold a rear portion of the wheelchair with a rear holding member from the rear side by a raising operation, wherein the derrick locking mechanism comprises:

a rail installed in the floor member to extend along the anteroposterior direction of the wheelchair when fixed;

a slider configured to be slidable along the rail;

a slider driving unit configured to drive the slider to slide;

a locking member of which one end is pivotally connected to the floor member and the other end is provided with the rear holding member; and a connecting member of which one end is pivotally connected to the slider and the other end is pivotally connected to a body portion of the locking member.

2. The wheelchair-fixing device of claim 1, wherein the front holding member holds the wheelchair at a position proximate to feet of an occupant in the wheelchair and the rear holding member holds the wheelchair at a position below the seat of the wheelchair.

3. The wheelchair-fixing device of claim 1, further comprising a control unit for controlling a raising and reclining operation of the derrick locking mechanism.

4. The wheelchair-fixing device of claim 1, wherein the rear holding member includes an engaging mechanism configured to lock the engagement of the rear holding member with the rear portion of the wheelchair.

5. The wheelchair-fixing device of claim 1, wherein the floor member is formed integrally with the vehicle.

6. A wheelchair-loadable vehicle, comprising:

a floor member on which a wheelchair can be mounted;

a front holding member disposed on the floor member configured to hold a front portion of the wheelchair from the front side; and a derrick locking mechanism configured to hold a rear portion of the wheelchair with a rear holding member from the rear side by a raising operation from the floor member, wherein the derrick locking mechanism comprises:

a rail installed in the floor member to extend along the anteroposterior direction of the wheelchair when fixed;

a slider configured to be slidable along the rail;

a slider driving unit configured to drive the slider to slide;

a locking member of which one end is pivotally connected to the floor member and the other end is provided with the rear holding member; and a connecting member of which one end is pivotally connected to the slider and the other end is pivotally connected to a body portion of the locking member.

7. The wheelchair-loadable vehicle of claim 6, wherein the front holding member holds the wheelchair at a position proximate to feet of an occupant in the wheelchair and the rear holding member holds the wheelchair at a position below the seat of the wheelchair.

8. The wheelchair-loadable vehicle of claim 6, further comprising a control unit for controlling a raising and reclining operation of the derrick locking mechanism.

9. The wheelchair-loadable vehicle of claim 6, wherein the rear holding member includes an engaging mechanism configured to lock the engagement of the rear holding member with the rear portion of the wheelchair.

10. The wheelchair-loadable vehicle of claim 6, wherein the floor member is formed integrally with the vehicle.

11. A wheelchair system comprising: a wheelchair;

a wheelchair-fixing device which comprises a floor member on which the wheelchair can be mounted and which is transportable and mountable on the vehicle, a front holding member disposed on the floor member configured to hold a front portion of the wheelchair from the front side, and a derrick locking mechanism configured to hold a rear portion of the wheelchair with a rear holding member from the rear side by a raising operation from the floor member; and a control unit for controlling a raising and reclining operation of the derrick locking mechanism, wherein the derrick locking mechanism comprises:

a rail installed in the floor member to extend along the anteroposterior direction of the wheelchair when fixed;

a slider configured to be slidable along the rail;

a slider driving unit configured to drive the slider to slide;

a locking member of which one end is pivotally connected to the floor member and the other end is provided with the rear holding member; and a connecting member of which one end is pivotally connected to the slider and the other end is pivotally connected to a body portion of the locking member.

12. The wheelchair system of claim 11, wherein the front holding member holds the wheelchair at a position proximate to feet of an occupant in the wheelchair and the rear holding member holds the wheelchair at a position below the seat of the wheelchair.

13. The wheelchair system of claim 11, wherein the rear holding member includes an engaging mechanism configured to lock the engagement of the rear holding member with the rear portion of the wheelchair.

14. The wheelchair system of claim 11, wherein the floor member is formed integrally with the vehicle.

* * * * *